(12) United States Patent
Hand et al.

(10) Patent No.: US 12,658,948 B1
(45) Date of Patent: Jun. 16, 2026

(54) LOW LOSS RADIO FREQUENCY TIME DELAY ARRANGEMENTS

(71) Applicant: Lockheed Martin Corporation, Bethesda, MD (US)

(72) Inventors: Thomas Henry Hand, Highlands Ranch, CO (US); Adam Blair Hess, Denver, CO (US); Joseph M. Torres, Littleton, CO (US); Sarah Elizabeth Hanson, Denver, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 379 days.

(21) Appl. No.: 18/446,763

(22) Filed: Aug. 9, 2023

Related U.S. Application Data

(60) Provisional application No. 63/486,834, filed on Feb. 24, 2023.

(51) Int. Cl.
*H04B 7/00* (2006.01)
*H04B 1/00* (2006.01)
(52) U.S. Cl.
CPC ........... *H04B 1/0078* (2013.01); *H04B 1/006* (2013.01)
(58) Field of Classification Search
CPC ........ H04B 1/006; H04B 1/0078; H04B 7/01; H03H 2007/006; H03H 7/30; H03H 9/131; H03H 2009/155; H03H 11/26; H01P 9/00
See application file for complete search history.

(56) References Cited

U.S. PATENT DOCUMENTS

| | | | |
|---|---|---|---|
| 6,701,141 B2 | 3/2004 | Lam | |
| 10,530,323 B2 * | 1/2020 | Chen | H01P 9/006 |
| 11,374,318 B2 * | 6/2022 | Morita | H01Q 25/004 |
| 2009/0074109 A1 * | 3/2009 | Foo | H01P 1/18 |
| | | | 375/308 |

OTHER PUBLICATIONS

Gong, Songbin et al., "Design of a V-Band Phase Shifter Using SP4T RF-MEMS Switches With Sonnet," 27th Annual Review of Progress in Applied Computational Electromagnetics, pp. 418-423, Mar. 27-31, 2011.

* cited by examiner

*Primary Examiner* — Tuan Pham

(57) ABSTRACT

Provided herein are various enhancements for including selectable delay or phase shift lines in microwave radio frequency (RF) systems. One example includes RF switches coupled between an RF input and an RF output. A first tier of the RF switches is coupled through first RF delay lines that produce first selectable delays or phase shifts, and a second tier of the RF switches is coupled through second RF delay or phase shift lines that produce second selectable delays or phase shifts. Tier coupling RF switches couple the first tier and the second tier and establish a cascaded arrangement among outputs of the first tier and inputs of the second tier.

16 Claims, 8 Drawing Sheets

301 ➚

DELAY LINE CHARACTERISTICS

| Delay line | delay time (ps) | physical length (mil) |
|---|---|---|
| τ0 | 5 | 34.08 |
| τ1 | 65 | 443.05 |
| τ2 | 125 | 852.03 |
| τ3 | 185 | 1261.00 |
| τ4 | 5 | 34.08 |
| τ5 | 20 | 136.32 |
| τ6 | 35 | 238.57 |
| τ7 | 50 | 340.81 |

300 ➚

STATE MAP FOR TIER 1-2 CASCADE

| State # | Delay Value | SPDT 221 | SPDT 222 | SPDT 231 | SPDT 232 | ABSOLUTE DELAY (ps) |
|---|---|---|---|---|---|---|
| 1 | τ0+τ4 | 00 | 00 | 00 | 00 | 10 |
| 2 | τ0+τ5 | 00 | 00 | 01 | 01 | 25 |
| 3 | τ0+τ6 | 00 | 00 | 10 | 10 | 40 |
| 4 | τ0+τ7 | 00 | 00 | 11 | 11 | 55 |
| 5 | τ1+τ4 | 01 | 01 | 00 | 00 | 70 |
| 6 | τ1+τ5 | 01 | 01 | 01 | 01 | 85 |
| 7 | τ1+τ6 | 01 | 01 | 10 | 10 | 100 |
| 8 | τ1+τ7 | 01 | 01 | 11 | 11 | 115 |
| 9 | τ2+τ4 | 10 | 10 | 00 | 00 | 130 |
| 10 | τ2+τ5 | 10 | 10 | 01 | 01 | 145 |
| 11 | τ2+τ6 | 10 | 10 | 10 | 10 | 160 |
| 12 | τ2+τ7 | 10 | 11 | 11 | 11 | 175 |
| 13 | τ3+τ4 | 11 | 11 | 00 | 00 | 190 |
| 14 | τ3+τ5 | 11 | 11 | 01 | 01 | 205 |
| 15 | τ3+τ6 | 11 | 11 | 10 | 10 | 220 |
| 16 | τ3+τ7 | 11 | 11 | 11 | 11 | 235 |

FIG. 3

LOW LOSS RADIO FREQUENCY TIME DELAY ARRANGEMENTS

RELATED APPLICATIONS

This application hereby claims the benefit of and priority to U.S. Provisional Patent Application 63/486,834, titled "LOW LOSS SELECTABLE RADIO FREQUENCY TIME DELAY UNITS," filed Feb. 24, 2023, which is hereby incorporated by reference in its entirety.

TECHNICAL BACKGROUND

In radio frequency (RF) systems, a Time Delay Unit (TDU) includes a plurality of parallel transmission lines (TLs) of various lengths, with switches used to select between various discrete delay states. Signals travel through specific transmission line paths depending on the desired time delay. TDUs are often used within Electronically Scanned Arrays (ESAs) to form wide-band scanning RF beams. TDUs provide true-time delay on signals in wideband phased arrays, and hence do not exhibit "beam squint" that is typical of phase shifter type architectures. A disadvantage and perception of conventional TDUs is that they are lossy, as traditional designs use two single-pole double throw (SPDT) switches per phased array 'bit' to select between a reference line and a delay line.

An example conventional TDU design 100 is shown in FIG. 1. Design 100 includes a single bit of a traditional TDU with two single-pole, double-throw (SPDT) switches that switch among a reference line and a delay line positioned between an RF input node and RF output node. Thus, design 100 includes a set of two SPDT switches per bit. To scale to more than one bit (two states), the number of switches in a design=2*(#of TDU bits). Because of the inherent insertion loss as scale, the total insertion loss=2*(#of TDU bits)+loss of longest delay line. This can be extremely large for large numbers of bits at high frequencies, as the number of switches typically drives the total loss in the TDU. For microwave phased array designs, this creates a potential for detrimental insertion losses for applications requiring a large total time delay and large number of bits.

SUMMARY

The examples herein include enhanced low loss Time Delay Unit (TDU) architectures, arrangements, and techniques for wide-band millimeter wave (mmW) RF phased arrays, Electronically Scanned Arrays (ESAs), and other applications. The TDUs herein employ ultra high reliability Micro-ElectroMechanical Systems (MEMS) to realize low-loss wideband true time delay units that overcome the high loss and large footprint problems associated with other TDUs. The enhanced TDU architectures and techniques are provided by arrays of selectable delay lines established between RF in/out nodes, using enhanced arrangements of RF switches.

One example includes an apparatus having radio frequency (RF) switches coupled between an RF input and an RF output. A first tier of the RF switches is coupled through first RF delay lines that produce first selectable delays or phase shifts. A second tier of the RF switches is coupled through second RF delay lines that produce second selectable delays or phase shifts. Tier coupling RF switches are configured to establish a cascaded arrangement among outputs of the first tier and inputs of the second tier.

An example method includes coupling radio frequency (RF) switches between an RF input and an RF output, providing a first tier of the RF switches coupled through first RF delay lines that produce first selectable delays or phase shifts, and providing a second tier of the RF switches coupled through second RF delay lines that produce second selectable delays or phase shifts. The method also includes providing tier coupling RF switches configured to establish a cascaded arrangement among outputs of the first tier and inputs of the second tier.

An example system includes a multi-layer circuit board having footprints configured to carry radio frequency (RF) switches, with layers of the circuit board housing routed lines each having a different corresponding time delay or phase shift. The RF switches form a pathway between an RF input and an RF output by at least selecting among first tier lines and second tier lines, and series coupling selected lines among the first tier lines and the second tier lines.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 3 illustrates a state map/truth table for an RF delay line arrangement in a 4-bit (16 state) implementation.

DETAILED DESCRIPTION

Figure 1:
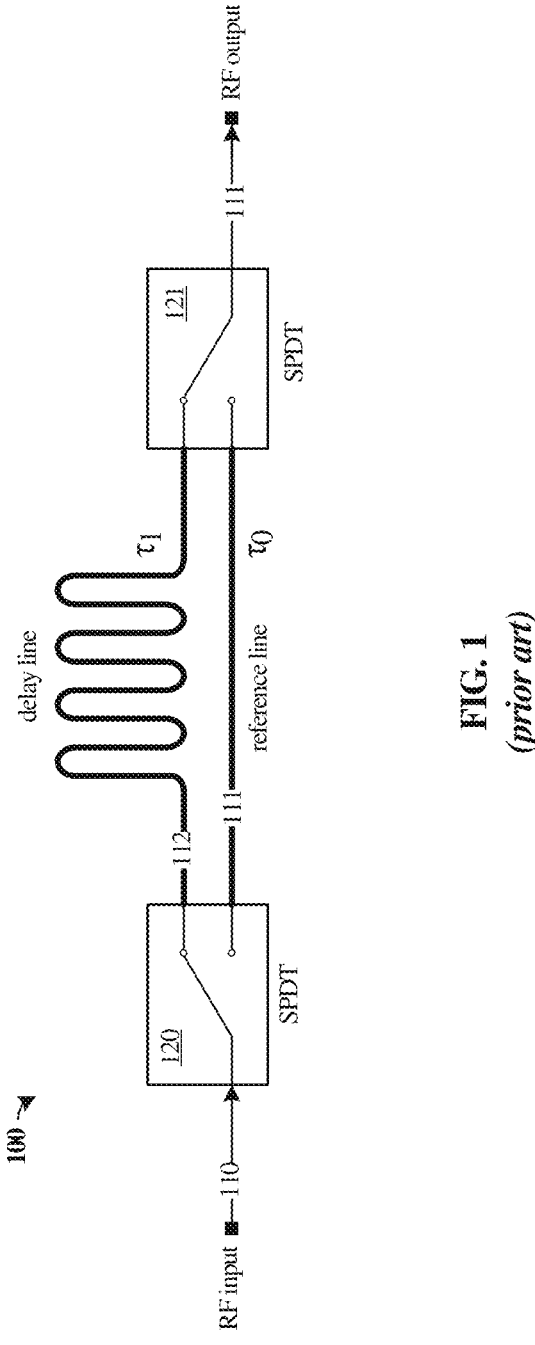
FIG. 1 illustrates a traditional 1-bit delay line arrangement.

The examples herein include enhanced low loss Time Delay Unit (TDU) architectures and arrangements for wideband RF phased arrays, Electronically Scanned Arrays (ESAs), and other applications. TDUs are typically implemented in wideband ESA systems, offering flat (or nearly flat) true-time delay over a wide bandwidth (typically multiple octaves). TDUs overcome limitations of phase shifters in that TDUs do not typically cause the array to squint the beam, which limits the usable instantaneous bandwidth of the ESA. The enhanced TDU architectures herein can be applied to a wide range of space, ground, airborne, or maritime based phased array systems. Many delay bits can be accommodated in a small area/footprint (comparable to a conventional MMIC) with much lower insertion loss, and this corresponds to achieving a given G/T (Rx) or EIRP (Tx) requirement with a smaller aperture and a reduced size, weight, power, and cost. Although the terms "time delay" or "delay line" are employed herein, it should be understood that the various routed signal lines or pathways can provide time delays or phase shifts to corresponding RF signals.

The TDUs herein employ high-reliability micro-electro-mechanical systems (MEMS) to realize low-loss wideband true time delay units which do not exhibit high loss and large footprint problems associated with other TDUs. Conventional TDUs suffer these problems because they traditionally use SPDT switches on GaAs MMICs, which are inherently lossy. Additionally, on-chip delay can cause these prior die and packages to be physically large, and can take up much needed space. The examples herein combine single-pole four-throw (SP4T) switches and off-chip time delay lines to provide wideband true time delay features. The enhanced designs herein can be implemented with low-loss/compact off-chip delay structures leveraging the three-dimensional delay line fabrication, such as glass-ceramic substrate, recta-coax, liquid crystal polymer (LCP) substrates, or other low-loss substrates, and associated processes. Advantageously, a low-loss, small footprint TDU can be established that significantly reduces insertion loss for a greater absolute time delay at a lower cost, resulting in improvements in size, weight, power and cost for wideband ESA systems. This technology, while focused for wide-band systems, will also work for narrowband systems.

As mentioned, the examples herein employ SP4T high-reliability MEMS switches rather than SPDT switches to halve the number of switches per bit, reduced from two (2) switches per bit to one (1) switch per bit. This configuration halves the insertion loss due to the switches by using half the quantity of switches, while other contributors to insertion loss for TDUs is the physical transmission lines for the time delay, which usually do not incur as much loss as the switches. This is advantageous because the insertion loss for a TDU includes the sum of the losses of each switch in addition to the insertion loss of the longest delay state, and is thus much lower loss than traditional TDUs that have a higher switch count. Also, traditional designs do not include wideband true time delay features and TDUs. Additionally, off-chip delay has been utilized for time delay implementations, but not with SP4T switches.

Additionally, MEMS switches are less lossy than typical GaAs, CMOS, or SiGe MMICs, thus the delay lines for the SP4T switches are realized using off chip delay lines in low-loss tangent dielectric materials so that losses are further reduced. Low-loss TDUs can realize competitive space-deployed ESAs, as the loss that is saved from the cascade equates to less LNA or HPA power that must be added to meet a requisite RF performance (i.e., sensitivity G/T, EIRP). Thus, while GaAs MMICs have high reliability, they are much higher in loss than the TDU architectures discussed herein. Moreover, GaAs MMIC options still have issues with much higher losses. The off-chip delay configuration discussed herein allows for customization of the TDU for different LSBs and delay ranges, and off-chip delay can be realized on low-dielectric materials that are adequate at across a wide range of frequencies, which can include millimeter wave ranges of frequencies.

The switches and accompanying printed wire board (PWB) or printed circuit board (PCB) are also cheaper than custom, purpose-built GaAs MMICs, as the delays comprise transmission lines and transitions and the switches comprise modular switch elements. Furthermore, this architecture can be modified for a variety of PWB materials, delay requirements, number of bits, and various stages of a cascade. This establishes ESA design commonality as the same architecture can be leveraged for a variety of designs. Additionally, MEMS switches can be reliable with >>3 billion cycles at 85° C. Further examples having loss/footprint reduction can employ glass, recta-coax, or liquid crystal substrates to realize 50-Ohm off-chip delays in extremely tight footprints. The architectures herein are thus agnostic to the off-chip delay/material that is used (e.g., Rogers CLTE-MW, 3DGS glass, LCP, Recta-Coax, Waveguide).

Figure 2:
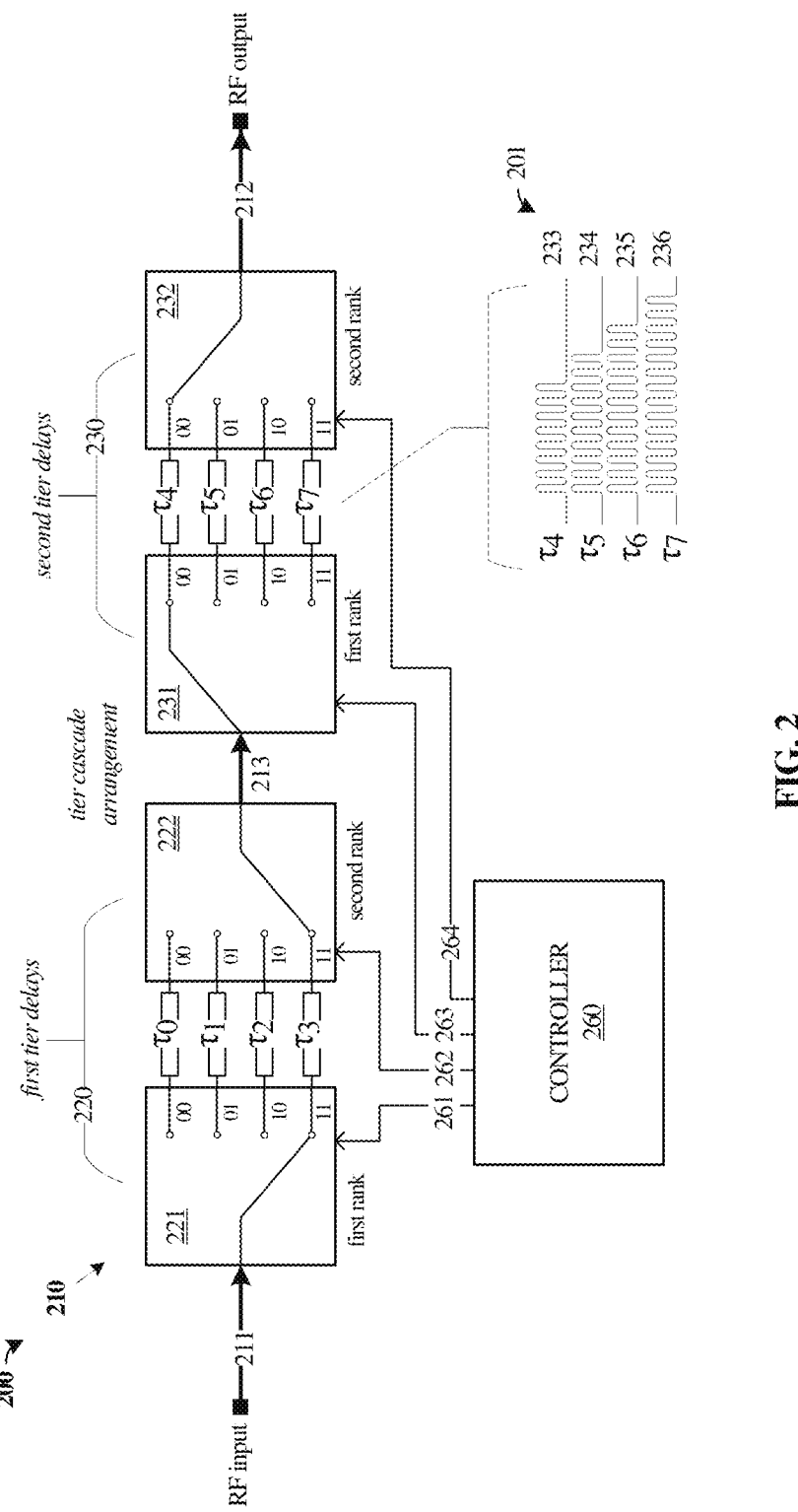
FIG. 2 illustrates an example RF delay line arrangement in a 4-bit (16 state) implementation.

FIG. 2 illustrates schematic view 200 of system 210. System 210 includes RF input 211 and RF output 212 which are coupled by several selectable lines implemented between sets or tiers of RF switches 221, 222, 231, 232. These lines each have a corresponding time delay (T=time delay) or phase shift, and eight (8) are shown, with four (4) in a first tier of delays 220 and four (4) in a second tier of delays 230. Thus, two sets of mirrored RF SP4T switches are coupled in a cascaded or series arrangement to establish up to 16 low-loss delay states (i.e., any combination of τ0-τ3 cascaded with any of τ4-τ7). Controller 260 is coupled to each RF switch over control links 261-264 to control switching among delay nodes according to various control schemes or control signaling determined from a further control unit, user input, operating conditions, or other factors.

In operation, a time delay or phase shift might be inserted between two RF ports or along an RF link. This delay can be provided by system 210 with a set of selectable delays. Bidirectional operation can be provided by system 210, such as for providing selectable delays on receive (Rx) or transmit (Tx) RF links. RF switches 221, 222, 231, 232 are organized into two tiers (220, 230), each tier having two 'ranks' of switches, namely a first rank including RF switches 221 and 231, and a second rank including RF switches 222 and 232. A bypass circuit can also be included (not shown) to provide selectable entrance or exit to/from the circuitry of system 210, or to bypass any delays. Alternatively, one or more of the time delays provided by system 210 might include effectively 'zero' delay lines. Also in this example, RF switches 222 and 231 act as cascade switches which form a series coupling among tier 220 and tier 230 over link 213. In this manner, a first delay can be selected from tier 220 and a second delay can be selected from tier 230, with link 213 coupling these delays in a series or cascaded arrangement.

An example set of delay lines 233-236 are shown in view 201. These include delays associated with the second tier of delays 230 (τ4-τ7), but can also be applicable to the first tier of delays 220 (τ0-τ3). Each of delay lines 233-236 comprises a length of a conductive material configured to carry an RF signal along the corresponding length between ports of the corresponding RF switch. These delay lines 233-236 can be implemented as conductive traces formed onto or into a layered substrate holding the RF switches. The substrate can comprise PCB, glass-ceramic substrate, recta-coax, liquid crystal polymer (LCP), other low-loss substrate to provide RF performance over a wideband microwave RF frequency range. Example substrates can comprise substrates to realize delay lines with 50-Ohm characteristic impedance. The architectures herein are thus agnostic to the off-chip delay material and process that is used (e.g., Rogers CLTE-MW, 3DGS glass, LCP). When lower frequencies are employed, other substrate materials can be employed, such as fiberglass (FR-4) or prepreg based printed circuit boards (PCBs).

RF switches 221, 222, 231, 232 each comprise single-pole four-throw (SP4T) RF switch devices, such as integrated circuit devices surface-mountable to a corresponding substrate or circuit board. To achieve the low insertion loss characteristics desired in system 210, low-loss micro-electromechanical systems (MEMS) RF switches can be employed, such as Menlo Micro SP4T MM5130 RF switches, among others.

Controller 260 comprises various circuitry, logic, processing elements, memory elements, storage elements, and communication interfaces. Controller 260 can comprise one or more microprocessors, central processing units (CPUs), microcontrollers, field-programmable gate arrays (FPGAs), application specific integrated circuits (ASICs), discrete logic, or other elements. Controller 260 can be implemented within a single device but can also be distributed across multiple devices or sub-systems that cooperate in executing program instructions. Controller 260 can thus be representative of any number of control elements distributed throughout system 210. Controller 260 might include one or more communication interfaces including discrete control inputs, digital interfaces (e.g., I2C, SMB), networked interfaces, or other selection/switch interfaces. Controller 260 might include or might be coupled to one or more analog-to-digital or digital-to-analog conversion units to convert signaling or status from an analog format into a digital format, or vice versa.

FIG. 3 includes example state map 300 for an RF delay line arrangement in an implementation. The states of FIG. 3 can be implemented using elements from system 210, although variations are possible. For example, the control scheme noted in FIG. 3 can be implemented by controller 260. In FIG. 3, sixteen (16) different states are presented in state map 300, labeled states 1-16 in the first column. The second column of state map 300 corresponds to delay values comprising series combinations of first tier and second tier delays, forming cascaded delay pairs (i.e., any of $\tau0$-$\tau3$ cascaded with any of $\tau4$-$\tau7$). The final column of state map 300 indicates absolute delays (in picoseconds (ps)) for each truth table state.

Columns 3-8 correspond to a truth table for control of SP4T RF switches 221, 222, 231, 232. Specifically, the SPDT RF switches shown for RF switches 221, 222, 231, 232 in system 210 are controlled in a binary fashion, with example control levels shown in FIG. 2. These control levels include binary conditions 00, 01, 10, and 11, noted for each RF switch, which are then combined into an eight-state format for each tier. State map 300 includes binary control indications for each among RF switches 221, 222, 231, 232, with corresponding binary control indications shown for each RF switch in FIG. 2. Thus, the control scheme noted in state map 300 includes selection of any combination of a one first tier delay and one second tier delay.

FIG. 3 also includes table 301 indicating characteristics for each delay line, in one example implementation. As shown in table 301, each delay line ($\tau0$-$\tau7$) can have a selected physical length (in mils, or one thousandth of an inch (0.001 inch)), and a selected time delay in picoseconds.

Figure 4:
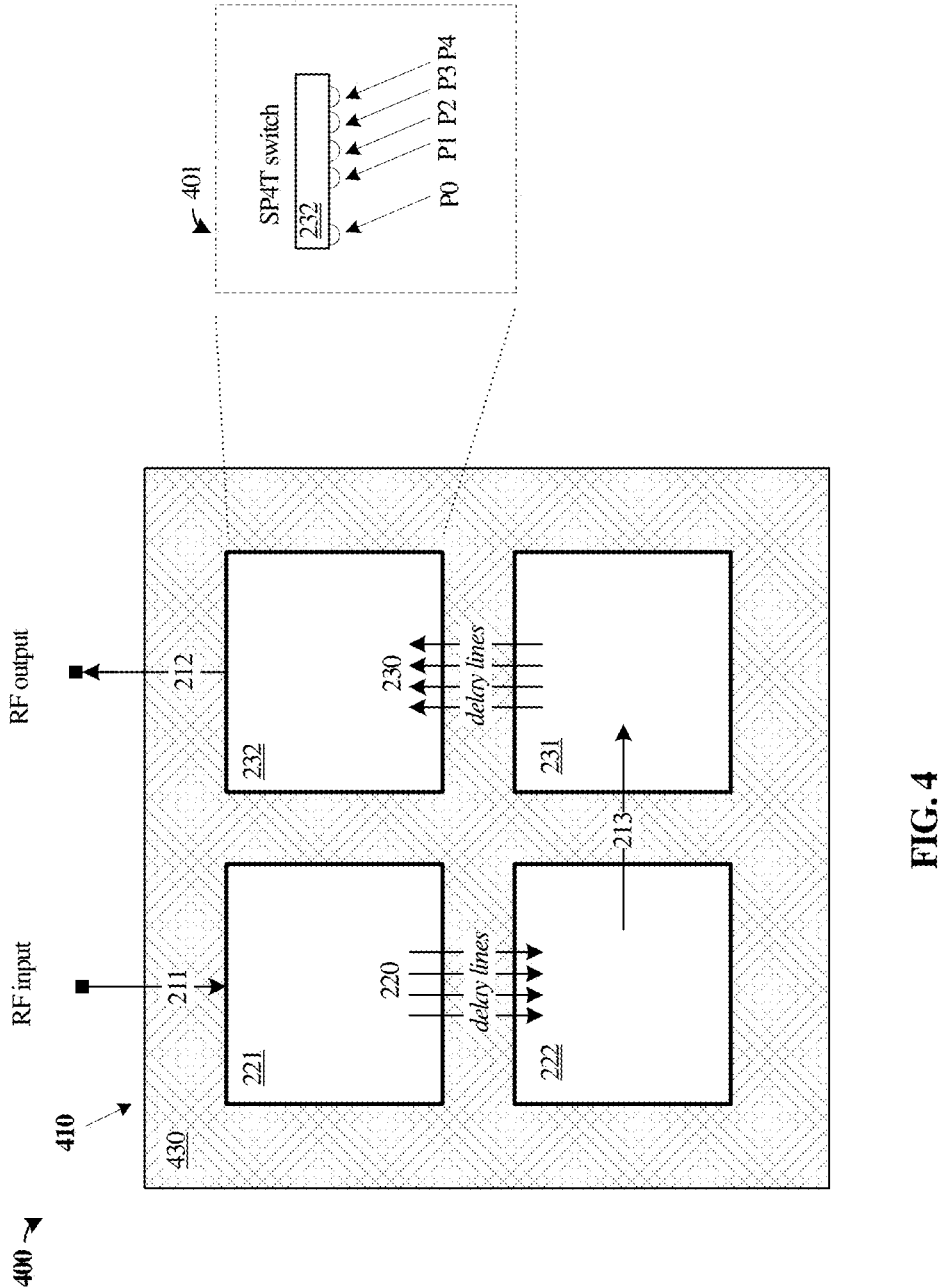
FIG. 4 illustrates an example integrated delay line arrangement in a packaged configuration implementation.

FIG. 4 is now included to illustrate an example implementation enhanced Time Delay Unit (TDU) architectures, such as that found in FIG. 2. FIG. 4 includes view 400 illustrating system 410 having four (4) RF switches 221, 222, 231, and 232 shown as surface mount integrated circuits mounted to substrate 430. RF switches 221, 222, 231, and 232 form a 4-bit TDU using four SP4T switches. RF switches 221, 222, 231, and 232 have link pathways indicated by arrows which are numbered 211-213, 220, and 230, with RF input 211 and RF output 212 providing input/output for this arrangement. RF link 213 establishes a series-coupled or cascaded arrangement, and elements 420 and 430 indicate individual delay lines. Other examples can have more or less integration of switches for each switch device, or include a different quantity of switches or devices. View 401 shows a side view of switch device 232, having five pins (pads or balls) P0-P4. P0 can correspond to the single "pole" of RF switch 232, and P1-P4 can correspond to the 4 "throws" of RF switch 232.

View 400 is a top-down view of a switch layout with delay line routing between switches established off-chip and underneath the switches (not shown), as indicated by the arrows for elements 420 and 430. RF switches 221, 222, 231, and 232 are mirrored together in pairs to connect four (4) transmission delay lines between members of the pair, which are formed off-chip. For example, a 2-bit (4 state) TDU can be realized using just 2 adjacent switches, (2.5 mm by 2.5 mm each arranged within a 5.51 mm×5.51 mm area), with off chip delay contained beneath the switch footprints. These switch pairs can easily be cascaded to accommodate a high number of bits while keeping switch count half that of a traditional TDU.

In this example, RF switches 221, 222, 231, and 232 comprise integrated circuits each housing SP4T switches. Advantageously, this implementation uses 4 switches instead of the 8 required for a traditional SPDT TDU network, and has reduced insertion loss. Specifically, the insertion losses at millimeter (mm)-wave frequencies due to the switches are cut in half. The 2.5 mm square switches in 2×2 configuration establishes a small total package size footprint, and utilizes off-chip delay in flip-chip attachment configurations. This implementation combines SP4T set in series (indicated by arrows) and allows for 16 delay lines (or 15 delay lines and a reference line). Using low-loss dielectric off-chip delay substrates allow for compact delay lines, and thin substrate layers allow for low loss, thin trace widths, and high delay density.

Figure 5:
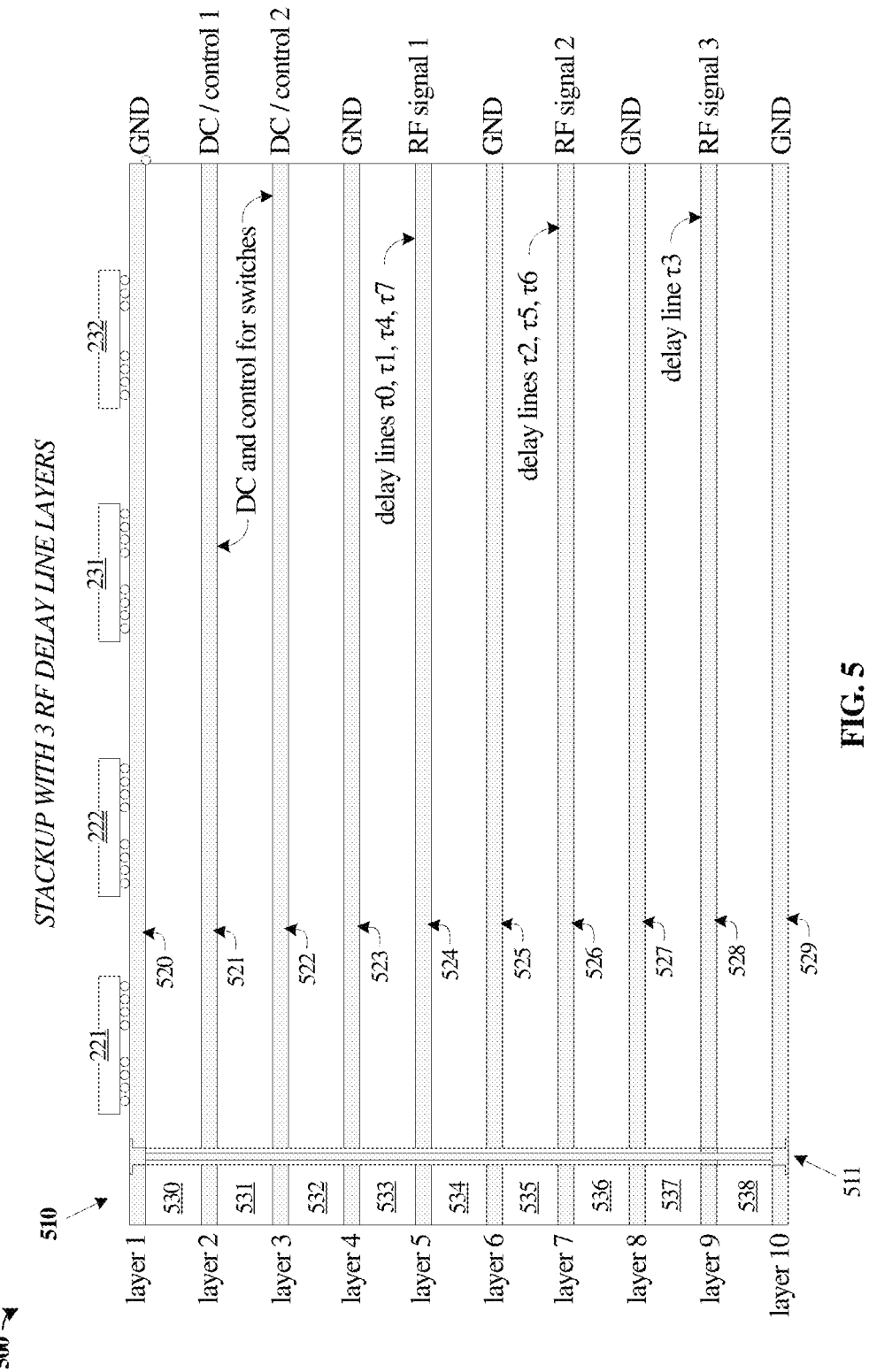
FIG. 5 illustrates an example circuit board stackup in an implementation.

FIG. 5 illustrates an example circuit board stackup in an implementation. The implementation of FIG. 5 can include elements from system 210 of FIG. 2 and system 410 of FIG. 4, although variations are possible. For instance, substrate 430 from FIG. 410 might be implemented using the example shown in FIG. 5. View 500 of FIG. 5 includes stackup arrangement 510 comprising a multi-layer circuit board having footprints configured to carry radio frequency (RF) switches, with layers of the circuit board housing delay lines each having a different time delay.

Arrangement 510 which includes ten (10) routable or conductive layers 520-529 each separated by layers 530-538 of non-conductive material. Conductive layers 520-529 can include etched or printed traces or routes which comprise metallic materials, such as copper, aluminum, or other suitable materials, including alloys and composite materials. Non-conductive materials comprising layers 530-538 can comprise dielectric or insulating materials, such as glass-ceramic substrate materials, liquid crystal polymer substrate materials, or other low-loss substrate materials. Surface mount RF switches are included in arrangement 510, which are shown as RF switches 221, 222, 231, and 232 from FIG. 2. Various traces comprising delay lines and connecting routes are coupled to RF switches 221, 222, 231, and 232 by the use of various vias or inter- and intra-layer routes. An example via 511 is shown as coupling the upper and lower ground layers of arrangement 510. Other vias can be included, but are omitted for clarity.

In arrangement 510, layers 520, 523, 525, 527, and 529 are configured as ground planes or ground layers, while layers 521 and 522 are configured to carry non-RF signaling, such as DC power and control signaling for RF switches 221, 222, 231, and 232. Additionally, several RF signaling layers are included which carry RF delay lines, namely layers 524, 526, and 528. The exact configuration of delay lines can vary based on implementation, and various vias can be employed to couple RF switches 221, 222, 231, and 232 to corresponding delay lines.

Figure 6:
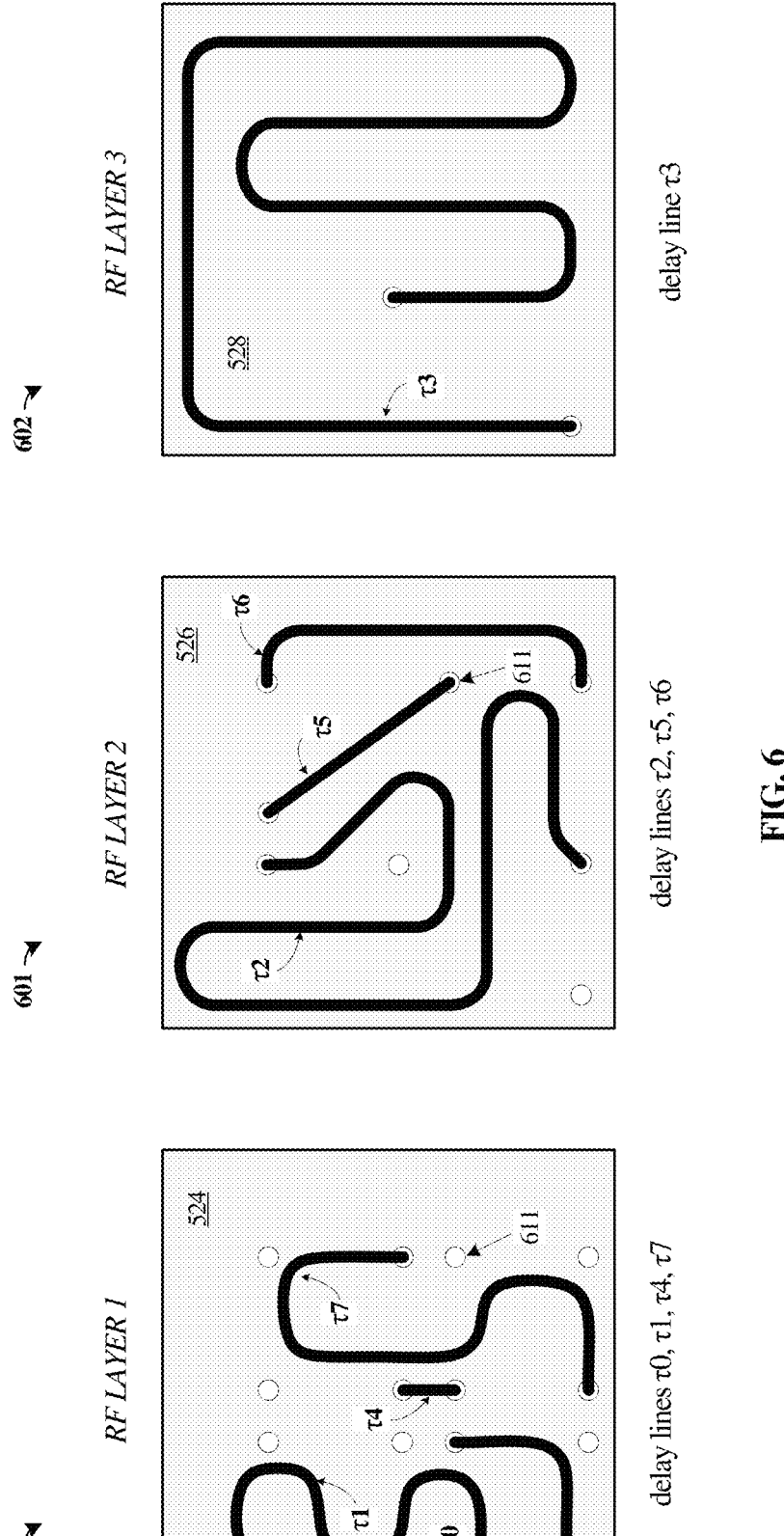
FIG. 6 illustrates example circuit board layers containing time delay structures in an implementation.

FIG. 6 illustrates example circuit board layers in an implementation. The layers of FIG. 6 can comprise the layers found in FIG. 5, although variations are possible. The exact lengths and corresponding time delays for each delay line, as well as the exact delay lines included on particular layers, can vary according to application. The delay lines shown in FIG. 6 are shown in a top-down view, in contrast to the cross-sectional view 500 shown in FIG. 5.

In view 600, layer 524 is shown as housing delay lines τ0, τ1, τ4, and τ7, each having a different corresponding time delay. In one example implementation, lengths of each delay line on layer 524 are as follows: τ0=27.58 mils, τ1=436.53 mils, τ4=27.58 mils, τ7=332.14 mils, with a transition length (e.g., via length) from the RF switches to layer 524 of 17.4 mils. Delay lines τ0 and τ4 might be configured to have the same time delay, or a reference time delay, to provide for bypass functionality among the RF switch configurations. In view 601, layer 526 is shown housing delay lines τ2, τ5, and τ6. In one example implementation, lengths of each delay line on layer 526 are as follows: τ2=793.71 mils, τ5=121.30 mils, τ6=209.28 mils, with a transition length (e.g., via length) from the RF switches to layer 526 of 28.8 mils. In view 602, layer 528 is shown housing delay line τ3. In one example implementation, length of each delay line on layer 528 are as follows: τ3=1164.87 mils, with a transition length (e.g., via length) from the RF switches to layer 528 of 62.2 mils. Thus, the total delay line length and corresponding time delay can include the transition length and the delay line length on a particular layer.

The delays lines featured in FIG. 6 comprise conductive traces with a 6 mm×6 mm footprint formed to have selected lengths and corresponding time delays, as well as selected characteristic impedances, such as 50 ohms. Additionally, vias are employed at the longitudinal ends of each delay line to couple to corresponding footprints/pads of RF switches. An example via is labeled as via 611 in FIG. 6, which can be seen extending through more than one layer.

Figure 7:
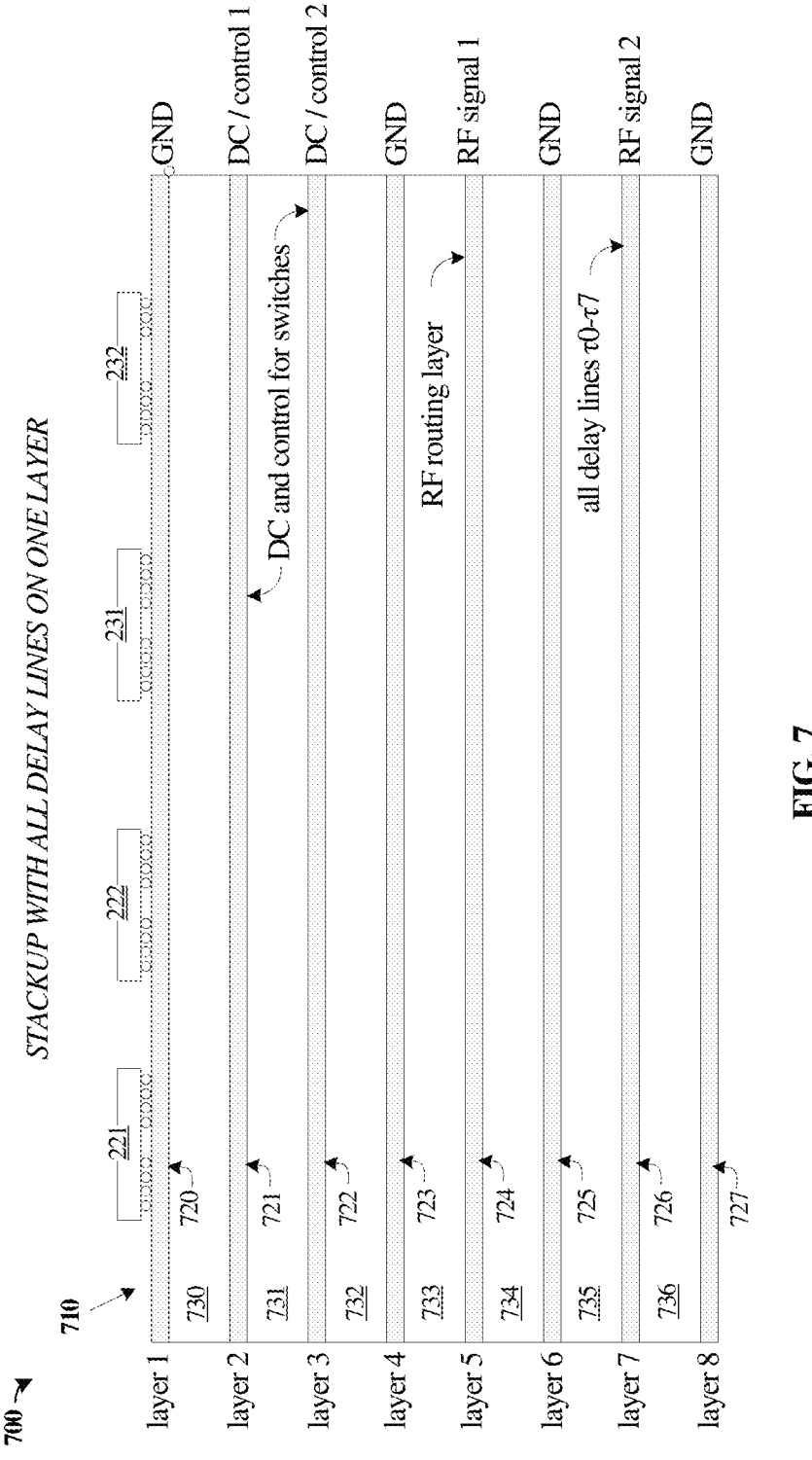
FIG. 7 illustrates an example circuit board stackup in an implementation.

FIG. 7 illustrates an example circuit board stackup in an implementation. The implementation of FIG. 7 can include elements from system 210 of FIG. 2 and system 410 of FIG. 4, although variations are possible. For instance, substrate 430 from FIG. 4 might be implemented using the example shown in FIG. 7. View 700 of FIG. 7 includes stackup arrangement 710 comprising a multi-layer circuit board having footprints configured to carry radio frequency (RF) switches, with layers of the circuit board housing delay lines each having a different time delay. Arrangement 710 includes all delay lines located on a single conductive layer, in contrast with arrangement 510 which includes delay lines on three (3) layers. However, one or more RF routing layers might be required to handle routing and connection of all of the delay lines from the delay line layer to the RF switches.

Arrangement 710 which includes eight (8) routable or conductive layers 720-727 each separated by layers 730-736 of non-conductive material. Conductive layers 720-727 can include etched or printed traces or routes which comprise metallic materials, such as copper, aluminum, or other suitable materials, including alloys and composite materials. Non-conductive materials comprising layers 730-736 can comprise dielectric or insulating materials, such as glass-ceramic substrate materials, liquid crystal polymer substrate materials, or other low-loss substrate materials. Surface mount RF switches are included in arrangement 710, which are shown as RF switches 221, 222, 231, and 232 from FIG. 2. Various traces comprising delay lines and connecting routes are coupled to RF switches 221, 222, 231, and 232 by the use of various vias or inter- and intra-layer routes.

In arrangement 710, layers 720, 723, 725, and 727 are configured as ground planes or ground layers, while layers 721 and 722 are configured to carry non-RF signaling, such as DC power and control signaling for RF switches 221, 222, 231, and 232. Additionally, two RF signaling layers are included which carry and route RF delay lines, namely layers 724 and 726. The exact configuration of delay lines can vary based on implementation, and various vias can be employed to couple RF switches 221, 222, 231, and 232 to corresponding delay lines.

Figure 8:
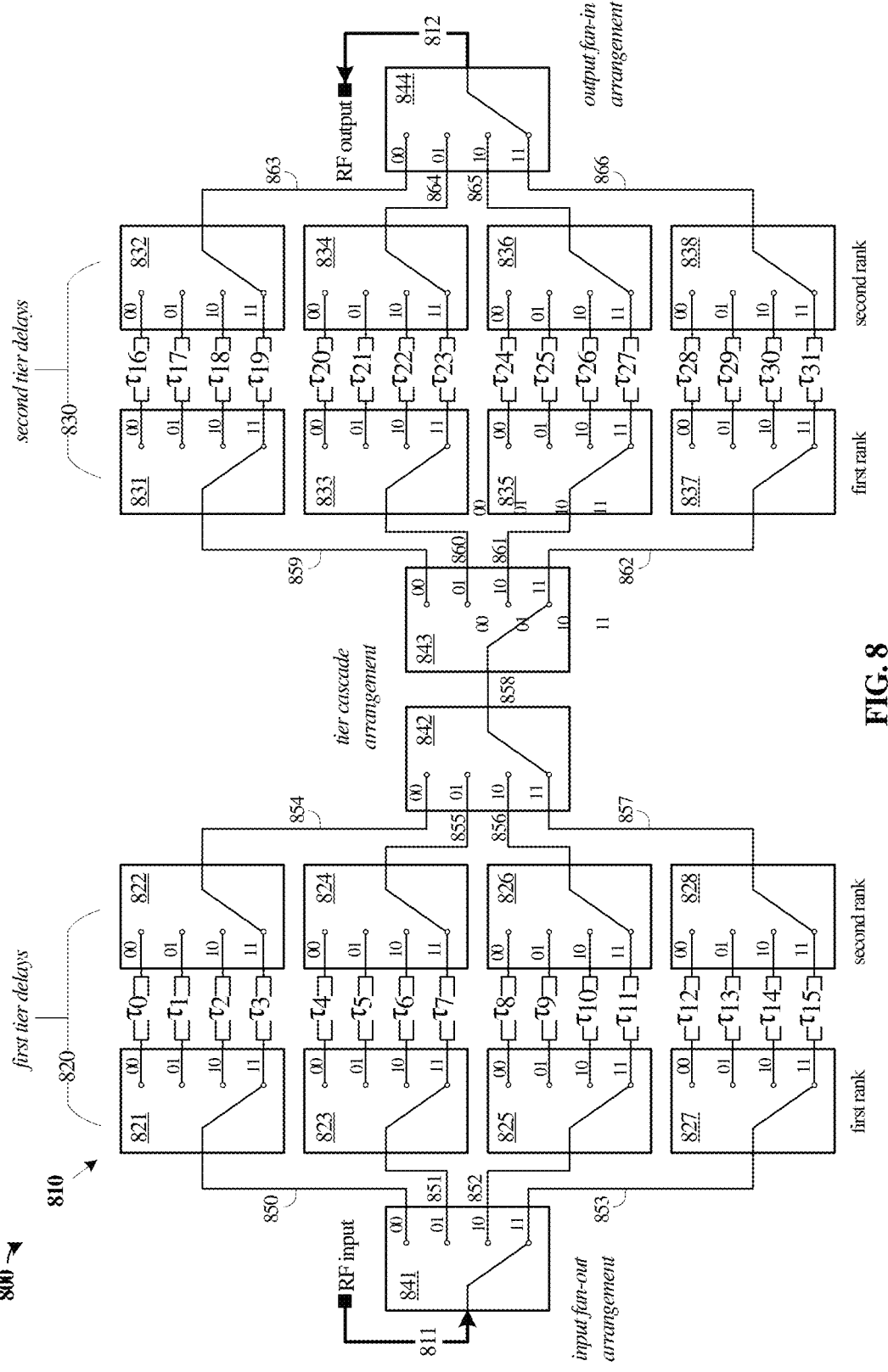
FIG. 8 illustrates an example RF delay line arrangement in an 8-bit (256 state) implementation.

FIG. 8 illustrates a schematic view 800 of system 810. System 810 forms a selectable/switched delay line architecture, such as that found in FIG. 2, but including a larger quantity of selectable delay lines. It should be understood that the delay lines featured in FIG. 8 can have different corresponding lengths and time delays than those featured in FIGS. 1-7. View 800 includes an RF input 811 and RF output 812 which are coupled by several selectable delay lines implemented between sets of RF switches. In FIG. 8, a 5-bit TDU device is provided, with twenty (20) RF switches 821-828, 831-838, and 841-844 connected in a two-tier cascaded (series/parallel) arrangement. Control of these RF switches can be handled similarly to that detailed in FIG. 3, adjusted for the increased quantity of delay lines and RF switches. The delay lines of FIG. 8 each have a corresponding time delay (τ=time delay), and thirty-two (32) low-loss delay states are shown (i.e., any of τ0-τ15 cascaded with any of τ16-τ31), with sixteen (16) in a first tier 820 of delays and sixteen (16) in a second tier 830 of delays. In this manner, a large number of delay lines can be selected among in a small footprint and with low insertion losses. A control circuit (not shown) can be coupled to each RF switch to control which nodes to switch among, such as found in FIG. 2 for controller 260, although variations are possible.

In operation, a time delay might be inserted between two RF ports or along an RF link. This delay can be provided by system 810 with a set of selectable delays. Bidirectional operation can be provided by system 810, such as for providing selectable delays on receive (Rx) or transmit (Tx) RF links. RF switches 821-828, 831-838, and 841-844 are organized into two tiers (820, 830), each tier having two 'ranks' of switches, namely a first rank in tier 820 including RF switches 821, 823, 825, 827, a first rank in tier 830 including RF switches 831, 833, 835, and 837, a second rank in tier 820 including RF switches 822, 824, 826, and 828, and a second rank in tier 830 including RF switches 832, 834, 836, and 838. A bypass circuit can also be included (not shown) to provide selectable entrance or exit to/from the circuitry of system 810, or to bypass any delays. Alternatively, one or more of the time delays provided by system 810 might include effectively 'zero' delay lines.

A more complex cascade arrangement is shown in FIG. 8 than in FIG. 2, with RF switch 841 included to provide "fan-out" from RF input 811, RF switches 842-843 included to provide series cascading between tiers over links 854-862, and RF switch 844 included to provide "fan-in" to RF output 812. In this example, RF switches 842 and 843 act as cascade switches which form a series coupling among tier

820 and tier 830 over link 858. In this manner, a first delay can be selected from tier 820 and a second delay can be selected from tier 830, with link 858 coupling these delays in a series or cascaded arrangement.

Each of delay lines associated with delays τ0-τ31 comprise a length of a conductive material configured to carry an RF signal along the corresponding length between ports of the corresponding RF switch. These delay lines can be implemented as conductive traces formed onto or into a layered substrate holding the RF switches. The substrate can comprise glass-ceramic substrate or liquid crystal polymer substrate to provide RF performance over a selected microwave RF frequency range. Example substrates can comprise substrates to realize delay lines with 50-Ohm characteristic impedance. The architectures herein are thus agnostic to the off-chip delay/substrate material that is used (e.g., Rogers CLTE-MW, 3DGS glass, Lark LCP). When lower frequencies are employed, other substrate materials can be employed, such as fiberglass or prepreg based PCBs.

RF switches 821-828, 831-838, and 841-844 each comprise single-pole four-throw (SP4T) RF switch devices, such as integrated circuit devices surface-mountable to a corresponding substrate or circuit board. To achieve the low insertion loss characteristics desired in system 810, MEMS RF switches can be employed.

Thus, the examples herein describe various systems, architectures, apparatuses, and techniques for coupling delay lines between RF nodes. In one example, an apparatus includes single-pole four-throw (SP4T) switches coupled between a radio frequency input and a radio frequency output. At least a portion of the SP4T switches are coupled to radio frequency delay lines that produce a selectable delay between the radio frequency input and the radio frequency output. In another example, the portion of the SP4T switches comprise a first set of SP4T switch coupled in a mirrored arrangement and select among a first set of radio frequency delay lines, the portion of the SP4T switches comprise a second set of SP4T switch coupled in a mirrored arrangement and select among a second set of radio frequency delay lines, and the first set is coupled to the second set. In yet another example, the SP4T switches comprise micro-electromechanical systems (MEMS) switches. In a further example, the radio frequency delay lines are external to the SP4T switches and comprise traces formed onto a substrate holding the SP4T switches, with the substrate comprising at least one among glass-ceramic substrate and liquid crystal polymer substrate. Although SP4T switches are discussed herein, the quantity of 'throws' and 'poles' can vary, such as to include a greater quantity of 'throws' for each 'pole'— e.g., SP3T, DP4T, SP8T, and other pole-throw configurations.

Various manufacturing methods, techniques, and processes can also be implemented using the examples herein. One example method includes coupling radio frequency (RF) switches between an RF input and an RF output, providing a first tier of the RF switches coupled through first RF delay lines that produce first selectable delays, and providing a second tier of the RF switches coupled through second RF delay lines that produce second selectable delays. The method also includes providing tier coupling RF switches configured to establish a cascaded arrangement among outputs of the first tier and inputs of the second tier. The method can include coupling the first tier of the RF switches in a mirrored pair arrangement to select among the first RF delay lines, and coupling the second tier of the RF switches in the mirrored pair arrangement to select among the second RF delay lines. The method can includes establishing the cascaded arrangement by at least providing selectable connections between the RF input and the first rank among the first tier of the RF switches, and providing selectable connections between the RF output and the second rank of the second tier of the RF switches. The method can include providing selectable couplings among any of the RF switches of the second rank of the first tier and any of the RF switches first rank of the second tier. The method can also include forming the first RF delay lines and the second RF delay lines external to the RF switches as traces formed on or in a substrate to which the RF switches are mounted.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:
   radio frequency (RF) switches mounted to a circuit board substrate and having RF connections to an RF input and an RF output;
   tiers of the RF switches coupled in a cascaded mirrored pair arrangement for RF delay lines coupled as an array of selectable time delays;
   the RF delay lines comprising conductive trace segments formed external to the RF switches and located underneath footprints of the RF switches on internal layers of a stackup of the circuit board substrate, and comprising vias at ends of the conductive trace segments that couple vertically through the stackup to connect to pads that mount to the RF connections of the RF switches; and
   the stackup comprising the internal layers housing the conductive trace segments bounded by electrical ground layers.

2. The apparatus of claim 1, wherein a first tier of the RF switches are coupled in a mirrored pair arrangement to select among first RF delay lines;

wherein a second tier of the RF switches are coupled in
the mirrored pair arrangement to select among second
RF delay lines.

3. The apparatus of claim 2, wherein tier coupling RF
switches in the cascaded mirrored pair arrangement com-
prise one among the first tier of the RF switches and one
among the second tier of the RF switches.

4. The apparatus of claim 1, wherein the tiers of the RF
switches comprise two ranks of the RF switches, with a first
rank coupled through corresponding RF delay lines to a
second rank.

5. The apparatus of claim 4, wherein tier coupling RF
switches establish the cascaded mirrored pair arrangement
by at least providing:
  selectable connections between the RF input and the first
    rank of the RF switches;
  selectable connections between the RF output and the
    second rank of the RF switches; and
  selectable couplings among any of the RF switches of the
    second rank and any of the RF switches first rank.

6. The apparatus of claim 1, wherein the substrate com-
prises at least one among a glass-ceramic substrate and
liquid crystal polymer substrate.

7. The apparatus of claim 1, wherein the RF switches
comprise single-pole four-throw (SP4T) RF switches.

8. The apparatus of claim 1, wherein the RF switches
comprise micro-electromechanical systems (MEMS)
switches.

9. A method, comprising:
  coupling radio frequency (RF) switches to a circuit board
    substrate and having RF connections to an RF input and
    an RF output; and
  providing tiers of the RF switches coupled in a cascaded
    mirrored pair arrangement for RF delay lines coupled
    as an array of selectable time delays;
  forming the RF delay lines comprising conductive trace
    segments external to the RF switches and located
    underneath footprints of the RF switches on internal
    layers of a stackup of the circuit board substrate, and
    comprising vias at ends of the conductive trace seg-
    ments that couple vertically through the stackup to
    connect to pads that mount to the RF connections of the
    RF switches; and
  forming the stackup comprising the internal layers hous-
    ing the conductive trace segments bounded by electri-
    cal ground layers.

10. The method of claim 9, comprising:
  coupling a first tier of the RF switches in a mirrored pair
    arrangement to select among first RF delay lines;
  coupling a second tier of the RF switches in the mirrored
    pair arrangement to select among second RF delay
    lines.

11. The method of claim 10, wherein tier coupling RF
switches in the cascaded mirrored pair arrangement com-
prise one among the first tier of the RF switches and one
among the second tier of the RF switches.

12. The method of claim 9, wherein the tiers of the RF
switches comprise two ranks of RE switches, with a first
rank coupled through corresponding RF delay lines to a
second rank.

13. The method of claim 12, comprising:
  establishing the cascaded mirrored pair arrangement by at
    least:
    providing selectable connections between the RF input
      and the first rank of the RF switches;
    providing selectable connections between the RF out-
      put and the second rank of the RF switches; and
    providing selectable couplings among any of the RF
      switches of the second rank and any of the RF
      switches first rank.

14. A system, comprising:
  a multi-layer circuit board having footprints on a surface
    configured to carry radio frequency (RF) switches, with
    internal layers of the circuit board housing routed RF
    delay lines interspersed with electrical ground layers;
  the RF switches arranged in a cascaded mirrored pair
    arrangement with RF connections that form a pathway
    between an RF input and an RF output by at least
    selecting among ones in an array of the RF delay lines;
    and
  the RF delay lines comprising conductive trace segments
    formed external to the RF switches and located under-
    neath footprints of the RF switches on the internal
    layers, and comprising vias at ends of the conductive
    trace segments that couple vertically through the multi-
    layer circuit board to connect to ones of the footprints
    that mount to the RF connections of the RF switches.

15. The system of claim 14, wherein first RF switches
providing a first tier of RF delay lines are coupled in the
cascaded mirrored pair arrangement;
  wherein second RF switches providing a second tier of RF
    delay lines are coupled in the cascaded mirrored pair
    arrangement; and
  wherein at least two RF switches selectively couple
    outputs of the first RF switches to inputs of the second
    RF switches to form a series coupling of tiers in the
    cascaded mirrored pair arrangement.

16. The system of claim 14, wherein the multi-layer
circuit board comprises at least one among a glass-ceramic
substrate and liquid crystal polymer substrate; and
  wherein the RF switches comprise micro-electromechani-
    cal systems (MEMS) switches.

* * * * *